Sept. 26, 1961            A. R. GAGNE            3,001,260

APPARATUS FOR THE VIBRATORY MOLDING OF CONCRETE SHAPES

Filed Sept. 15, 1958            4 Sheets-Sheet 1

*INVENTOR.*
ARCHIE R GAGNE

BY Lindberg & Bradway
ATTORNEYS

INVENTOR.
ARCHIE R. GAGNE
BY
Lindberg & Bradway
ATTORNEYS

Sept. 26, 1961  A. R. GAGNE  3,001,260
APPARATUS FOR THE VIBRATORY MOLDING OF CONCRETE SHAPES
Filed Sept. 15, 1958  4 Sheets-Sheet 3

INVENTOR.
ARCHIE R. GAGNE
BY *Lindberg & Bradway*
ATTORNEYS

Sept. 26, 1961 A. R. GAGNE 3,001,260
APPARATUS FOR THE VIBRATORY MOLDING OF CONCRETE SHAPES
Filed Sept. 15, 1958 4 Sheets-Sheet 4

INVENTOR.
ARCHIE R. GAGNE
BY Lindberg & Bradway
ATTORNEYS

United States Patent Office 3,001,260
Patented Sept. 26, 1961

3,001,260
APPARATUS FOR THE VIBRATORY MOLDING OF CONCRETE SHAPES
Archie R. Gagne, Franklin Park, Ill., assignor to Amplus, Inc., Naperville, Ill., a corporation of Illinois
Filed Sept. 15, 1958, Ser. No. 761,059
6 Claims. (Cl. 25—121)

This invention relates generally to the molding of concrete shapes and more particularly to the controlled vibration of the concrete mass being molded.

In the molding of concrete structural shapes, such as pre-stressed concrete beams and multi-duct concrete conduit, it is desirable to use a mix having a low water-cement ratio. The workability of low water-cement ratio mixes must be taken into consideration in the molding operation, and where extremely dry mixes are employed it is not generally feasible to employ the immersion type of vibrator for avoiding honeycomb in the finished product. In fact, the presence of pre-stressed steel in the molding of beams makes it almost impossible to employ the immersion type of vibrator.

According to the present invention, it is possible to employ in the manufacture of both pre-stressed concrete beams and the aforesaid conduit, form vibrators which insure a positive and known excursion of mold elements with respect to each other, the use of such positively excursing mold elements making it possible to employ substantially no slump high strength concrete.

In one embodiment of the invention where pre-stressed concrete beams are manufactured, the beam is molded between a pair of mold halves having a positive excursive movement in a horizontal plane. The table upon which the mold halves are mounted is arranged to have movement in a vertical plane only, and the combination of the movement of the mold halves in a horizontal plane while also vibrating in a vertical plane makes it possible to obtain molded articles free from honeycomb.

In cases where a multi-duct concrete conduit is molded, for example, the mold halves are likewise arranged to have a known excursion with respect to each other.

Irrespective of whether the mold halves are of the type for casting a pre-stressed beam or the like, or for casting a length of concrete conduit, positive displacement of the mold halves with respect to each other is achieved by a vibrator and yoke assembly connecting the mold halves for the required excursion. In either form of the invention it is possible to obtain the vibration of the mold portions from a single vibrating source, with vibrating elements which are always so arranged that at no time will there be any tendency of the vibrating elements to negate the effect of each other.

With the foregoing considerations in mind it is a principal object of the invention to mold relatively large concrete masses with external vibrating means, and to insure that the mold portions wherein such articles are molded will have a positive and known excursion with respect to each other to insure a concrete mass having high density and freedom from honeycomb.

Another object is to vibrate and mold a concrete mass within mold portions which are connected in a vibratile manner to a single vibrating source, the two mold portions being at all times arranged to have positive excursion with respect to each other.

Yet another object comprehends the use of mold portions through which extend reinforcing or duct providing members, making the contents of the mold incapable of being vibrated by immersion type of vibrators, the mold portions being vibrated by means insuring at all times that the mold portions have a known and definite excursion with respect to each other, thereby making it possible to employ a dense mix of a low water cement ratio and having substantially no slump, thereby to provide a dense concrete free from honeycomb.

Other objects and important features of the invention will be apparent from a study of the specification following taken with the drawings, which together describe and illustrate a number of forms which the invention can assume in practice, and showing the best modes of practicing the principles of the invention. Other embodiments of the invention will be suggested to those having the benefit of the teachings herein and such other embodiments are intended to be reserved especially as they fall within the scope of the subjoined claims.

In the drawings:

FIG. 1 is an elevational view of apparatus according to the present invention for forming a pre-stressed concrete beam or the like;

FIG. 3 is a transverse section taken along the line 3—3 of FIG. 1 looking in the direction of the arrows;

Figure 1:
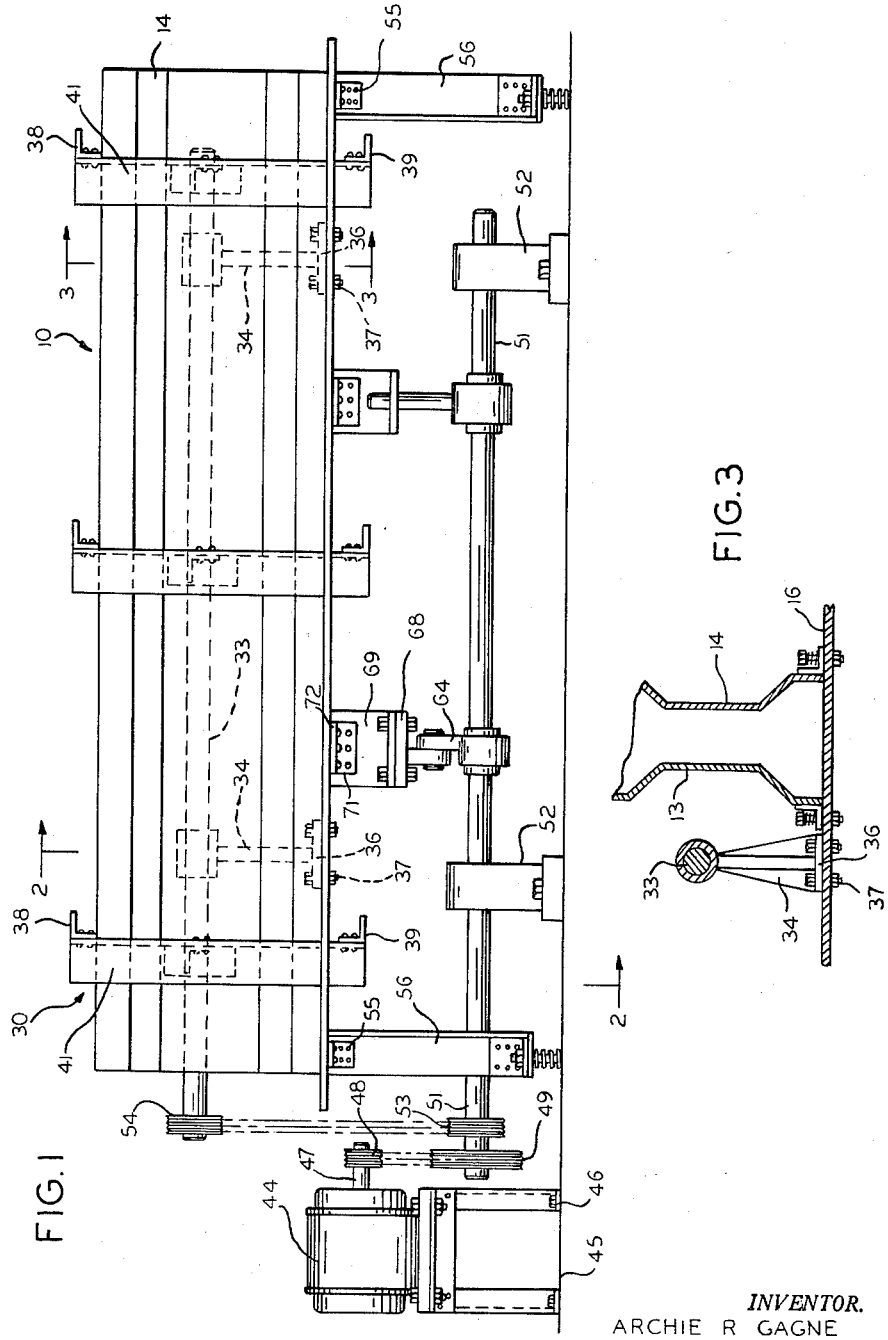
Figure 2:
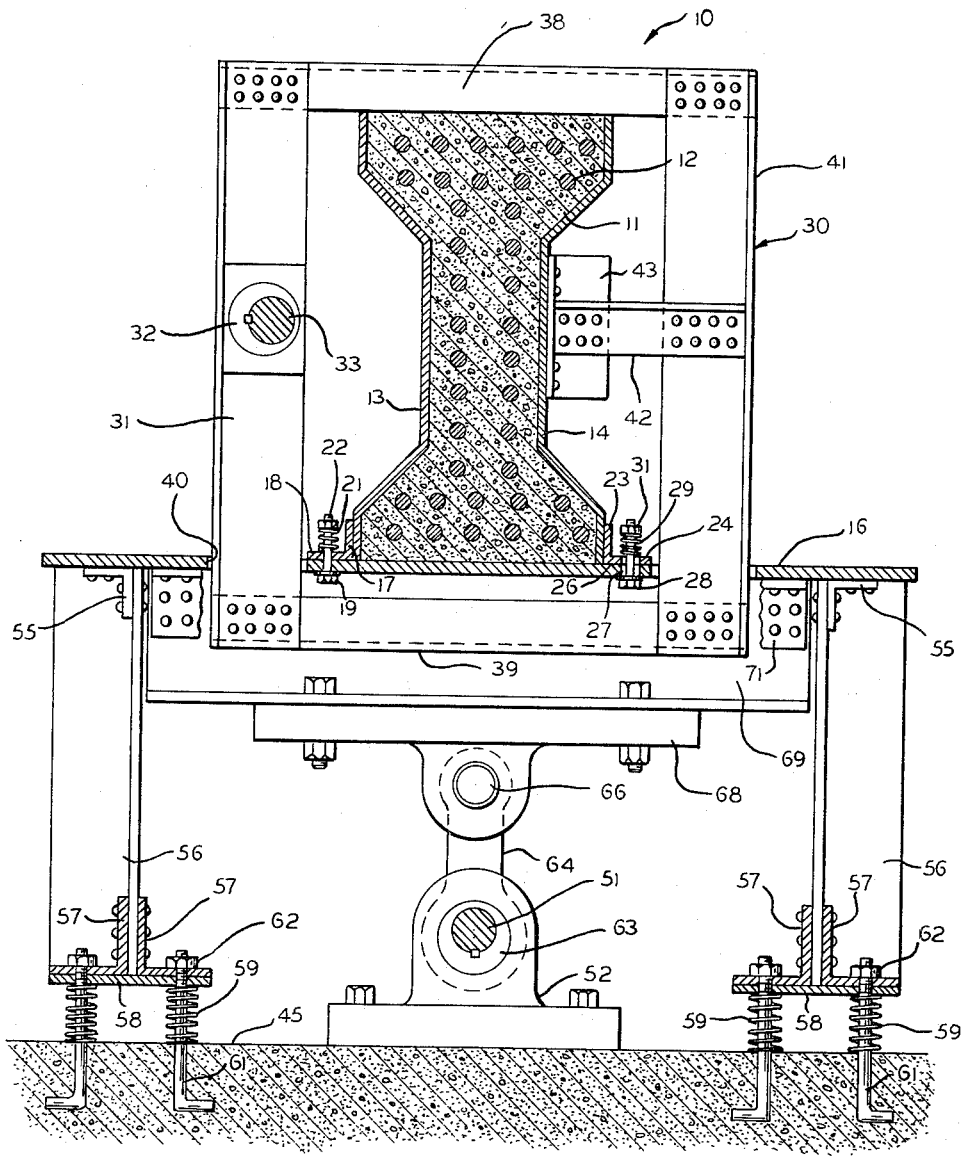
FIG. 2 is a section, to an enlarged scale, taken substantially along the line 2—2 of FIG. 1, looking in the direction of the arrows.

Referring now to FIGS. 1 and 2 of the drawings, apparatus according to one embodiment of the present invention is referred to by the reference numeral 10, and is employed for compacting and molding a concrete beam 11 having pre-stressed reinforcing elements 12 extending longitudinally thereof. Means, not shown, may be employed for imposing stress on the reinforcing elements during the molding process, and such means form no part of the present invention, and accordingly are not described herein.

The beam 11 is molded within a pair of mold halves 13 and 14, each resting upon a table 16. Mold half 13 is held to the table 16 and rests upon a longitudinally extending angle shaped foot 17. Foot 17 has a base flange 18, and a bolt 19 passes through the base flange 18 and the support table 16, there being a spring 21 interposed between the base angle 18 and a nut 22 threaded to the bolt 19.

Mold half 14 likewise has a longitudinally extending foot 23 with a base flange 24, the base flange 24 having a slot 26 therein, and the table 16 thereat likewise having a slot 27, a bolt 28 passing through the slots 26 and 27. A spring 29 and a nut 31 threaded to the bolt 28 hold the mold half 14 in place upon the table 16. As will be described, the provision of the slots 26 and 27 insure movement laterally of mold half 14 with respect to the mold half 13.

Means are provided for causing the mold half 14 to have positive excursion with respect to the mold half 13 during the molding process, and to this end there is provided a yoke indicated generally by the reference numeral 30. The yoke 30 includes a vertical member 31 flanking mold half 13 and having vibrating motion in a horizontal direction by means of an eccentric 32 turning with a shaft 33 which is fixed in its distance from the mold half 13. Shaft 33 is supported by pillow blocks 34 spaced along the table 16 and having feet 36 held fixedly to the table 16 by through bolts 37, see also FIG. 3.

The upper and lower ends of member 31 are riveted to horizontally and laterally extending strap members 38 and 39, strap member 38 passing over the top of the mold halves 13 and 14, see FIG. 2, and strap member 39 extending beneath the table 16 and parallel thereto. An opening 40 is provided in table 16 for member 31, said opening being of a dimension to accommodate the vibrating movement of member 31. The ends of the strap members 38 and 39 remote from their connection to the member 31 are riveted to a vertical member 41 at each end thereof. Member 41 flanks mold half 14 and is rigidly connected thereto by means of an angle member 42 riveted to member 41 and an angle member 43 riveted to member 41 and also riveted to the mold half 14.

Since the shaft 33 has its distance fixed with respect to the mold half 13, the excursion of mold half 14 with respect to the mold half 13 will be twice the eccentricity of the eccentric 32 with respect to the center of the shaft 33.

Means are provided for driving the shaft 33, and to this end there is provided a motor 44, see FIG. 1, mounted upon a pedestal 46 supported on a concrete pad 45. Motor 44 has a drive shaft 47 with a pulley 48 at the end thereof. Pulley 48 drives a pulley 49 fast upon a shaft 51 supported in pillow blocks 52, secured to concrete pad 45, and driven shaft 51 has fast thereto a pulley 53 driving a pulley 54 fast on shaft 33.

The table 16 is supported upon legs 56 secured at the upper ends by angles 55 to the table 16, and the lower ends of the legs 56 are provided with base angles 57 and a base plate 58. The legs 56 and table 16 are resiliently supported in spaced relationship to the concrete pad 45 by means of springs 59 guided upon pins 61 anchored in the concrete pad 45. The pin 61 is threaded to receive a nut 62 bearing against the base angle 57.

Means are provided for imparting vertical vibratory motion to the table 16, and to this end shaft 51 has eccentric 63 keyed thereto which turns within a link 64 pivotally connected at 66 to a pillow block 68 bolted to the underside of back to back angles 69. Angles 69 in turn are riveted to angles 71 having their horizontal extending limbs riveted to the table 16.

It will be seen that the structure thus far described enables the concrete between the mold halves to be vibrated in both horizontal and vertical directions. The excursion of the mold halves 13 and 14 is known exactly by the arrangement of the yoke 30 driven in a vibratory fashion by means of the eccentric 32. The links 64 insures that the table will have only a vertical motion, it being resiliently mounted upon the spring 59.

Figure 4:
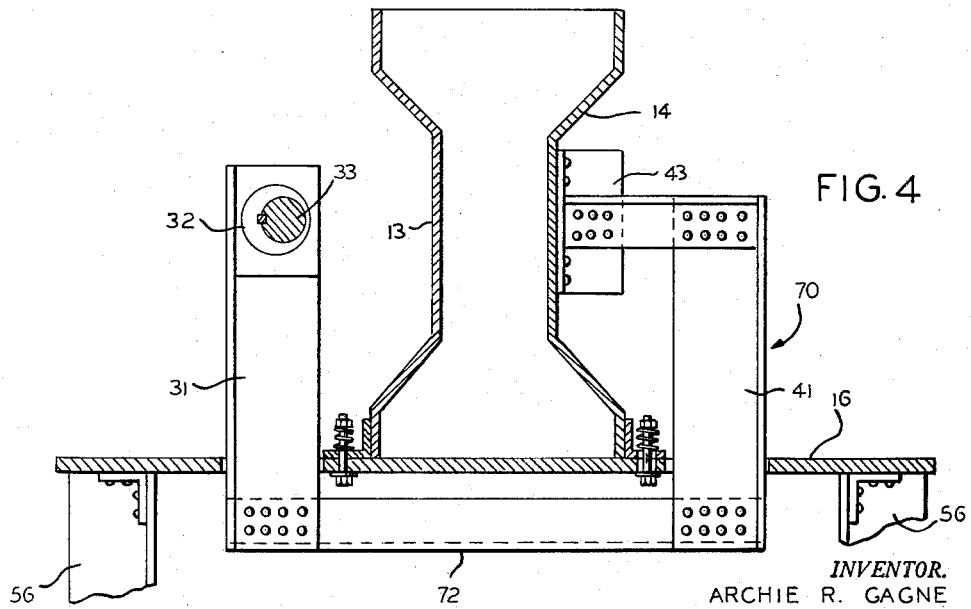
FIG. 4 is a view similar to FIG. 2, but showing details of an alternate form of a yoke for causing displacement and excursion of the mold halves with respect to each other.

Referring now to FIG. 4 of the drawings, there is shown another embodiment where the mold halves are connected by a yoke indicated generally by the reference numeral 70. In this embodiment of the invention the vertical members 31 and 41 are connected beneath the table 16 by means of a lower strap member 72. This enables the cavity between the mold halves 13 and 14 to be filled readily without the interference of a strap member 38, such as is shown in FIG. 2, extending over the top of the mold.

Figure 6:
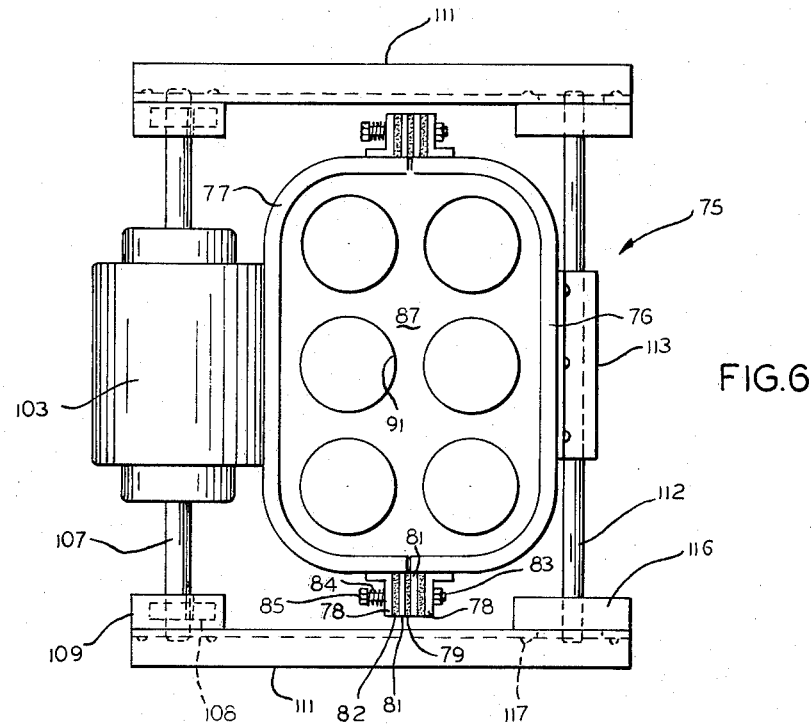
FIG. 6 is a plan view of the mold and the vibrating means therefor shown in FIG. 5.
Figure 5:
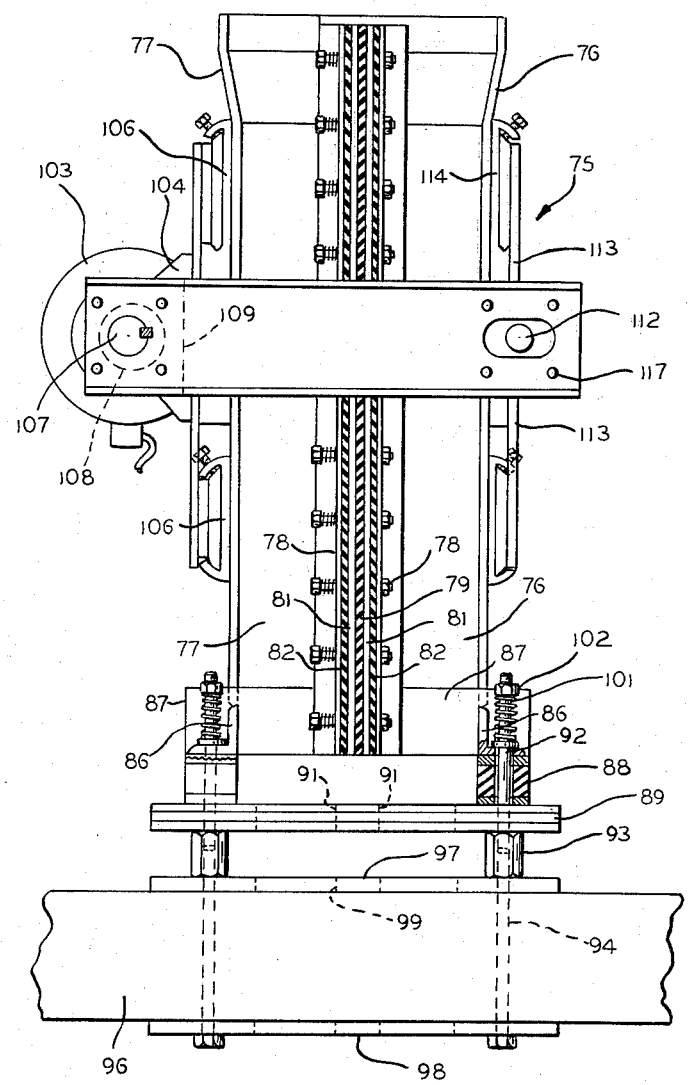
FIG. 5 is an elevational view of a pair of mold halves for forming multi-duct concrete conduit, and embodying principles according to the present invention.

Referring now to FIGS. 5 and 6 of the drawings there is shown another embodiment of the invention indicated generally by the reference numeral 75 where the apparatus is particularly useful in the molding of multi-ducted concrete conduit such as is disclosed in Gagne applications Serial Nos. 659,299 and 733,542, filed respectively on May 15, 1957 and May 7, 1958 for Improvements in Apparatus for Making Multi-Duct Concrete Conduit.

The apparatus shown in FIGS. 5 and 6 includes a pair of mold halves 76 and 77, each of the mold halves being provided with angle members 78 extending longitudinally thereof. The mold halves are separated a slight amount by means of a central rubber shim 79 alternating with a longitudinally extending spacer member 81 and a longitudinally extending elastic shim 82, the mold halves 76 and 77 being connected together by means of a bolt 83, a spring 84 and a nut 85. As described in Gagne application Serial No. 733,542 filed May 7, 1958, the two mold halves 76 and 77 are arranged to have excursion with respect to each other so that a no slump concrete mix can be vibrated therein.

The mold halves 76 and 77 have base angles 86, and the lower ends of each mold half have a stiffener plate 87 welded thereto. The mold is supported upon a rubber pad 88 resting upon a plate 89 having openings 91 therein corresponding to the number of ducts to be formed within the concrete mass molded within the mold halves 76 and 77. The mold halves 76 and 77 are held in position upon the pads 86 by means of a stud 92 threaded into a nut 93 in turn threaded to a bolt 94 extending through a stage 96. The stage 94 may be provided with upper and lower guide plates 97 and 98 each having openings 99 for guiding mandrels, not shown, and corresponding in position to the holes 91 in the base 89.

As seen in FIG. 5, the mold halves 76 and 77 are resiliently held in position on the plate 89 by a spring 101 and a nut 102 bearing against the spring 101 and threaded to the stud 92.

Means are provided for controlling the excursion of mold half 76 with respect to mold half 77, and to this end there is provided a motor 103 having a base 104 secured by brackets 106 to mold half 77. Motor 103 has a shaft 107 with an eccentric 108 fast to each end thereof. Eccentric 108 turns within a follower 109 held to a strap 111 extending along each end of the mold halves 76 and 77. The straps 111 are connected to the ends of a stationary shaft 112 supporting a bracket 113 at the center thereof. Bracket 113 is held to a bracket 114 in the mold half 76. The shaft 112 is held at its ends in a mounting 116 on the strap 111, and mounting 116 can be adjusted in position by adjusting screws 117. The arrangement of the shaft 107 and the eccentric 108 is such as to give excursion of the mold half 76 with respect to mold half 77 an amount equal to twice the eccentricity of the eccentric 108, the rubber shim 79 between the angles 78, 78 being compressible by such twice the amount of eccentricity.

As with the embodiment described with reference to FIGS. 1 to 4 inclusive it is possible to employ an extremely low water-cement ratio mix having no slump. The excursion of the mold halves insures in the case described with reference to FIGS. 5 to 6, inclusive, a molded concrete article free from honeycomb and having extremely high density, all being accomplished without the need of an immersion type vibrator and without the need of a plurality of vibrators connected to the outside of the mold portion 76 and 77.

While the invention has been described in terms of a number of embodiments which it may assume in practice, the scope of the invention is intended to be limited only by the claims here appended.

I claim as my invention:

1. In apparatus of the class described for molding articles from concrete mixes, a table and a mold supported thereon, said mold being of rectangular cross section and comprising mold halves spaced from each other, one of said mold halves being secured to said table and the other being mounted on said table for movement with respect thereto, each of said mold halves including a side wall and end walls extending therefrom in confronting relationship with the end walls of the other mold half, a flange extending longitudinally along each end wall of a mold half along the edge thereof and in confronting relationship with a flange of the other mold half, a resilient shim disposed between each confronting pair of flanges adapted to form a seal for the contents within said mold and maintain said mold halves in the aforesaid spaced relationship, fastening means securing said mold halves together yet providing movement of said mold halves with respect to each other for compaction of material within said mold, said fastening means comprising a bolt extending through said confronting flanges and said resilient shim, and resilient means interposed between one end of said bolt and one of said confronting flanges, and means for vibratingly moving said mold halves toward and away from each other through a known distance comprising a motor mounted on one of said mold halves, a shaft driven by said motor, an eccentric fast on said shaft, a yoke including a member fixed to the said other mold half, and an arm pivotally connected to one end of said fixed member and connected to said eccentric.

2. In apparatus of the class described for molding articles from concrete mixes, a table and a mold supported thereon, said mold being of rectangular cross section and comprising mold halves spaced from each other, means for mounting said mold halves on said table for movement with respect to each other, each of said mold halves including a side wall and end walls extending therefrom in confronting relationship with the end walls of the other mold half, a flange extending longitudinally along each end wall along the edge thereof, and in confronting relationship with a flange of the other mold half, a resilient shim disposed between each confronting pair of flanges adapted to form a seal for the contents within said mold and maintain said mold halves in the aforesaid spaced relationship, fastening means securing said mold halves together yet providing movement of said mold halves with respect to each other for compaction of material within said mold, said fastening means comprising a plurality of bolts spaced along said confronting flanges and extending through said confronting flanges and said resilient shim, and resilient means interposed between one end of each of said bolts, and one of said confronting flanges, and means for vibratingly moving said mold halves toward and away from each other through a known distance comprising a motor mounted on one of said mold halves, a shaft driven by said motor, a pair of eccentrics fast on said shaft, a yoke including a member fixed to the said other mold half, and an arm pivotally connected to each end of said fixed member and connected to one of said eccentrics.

3. In apparatus of the class described for molding articles from concrete mixes, a mold of rectangular cross section and comprising mold halves spaced from each other, each of said mold halves including a side wall and end walls extending therefrom in confronting relationship with the end walls of the other mold half, a flange extending longitudinally along such end wall of a mold half along the edge thereof and in confronting relationship with a flange of the other mold half, a resilient shim disposed between each confronting pair of flanges adapted to form a seal for the contents within said mold and maintain said mold halves in the aforesaid spaced relationship, fastening means securing said mold halves together yet providing movement of said mold halves with respect to each other for compaction of material within said mold, said fastening means comprising means extending through said confronting flanges and said resilient shim, and resilient means interposed between one end of said last named means and one of said confronting flanges, and means for vibratingly moving said mold halves toward and away from each other through a known distance comprising a motor mounted on one of said mold halves, a shaft driven by said motor, eccentrics fast on said shaft, a yoke member fixed to the said other mold half, and an arm pivotally connected to each end of said fixed member and connected to said eccentric.

4. In apparatus of the class described for molding articles from concrete mixes, a mold composed of mold halves which are spaced laterally of each other, each of said mold halves including a longitudinally extending flange along the edges of each mold half and in confronting relationship with a flange of the contiguous mold half, elastomeric means disposed between said mold halves and adapted to form a seal for the material being molded, means for connecting said mold halves together with said elastomeric means disposed between said flanges and enabling said mold halves to move toward and away from each other while so connected, said means comprising resilient means between one end of said fastening means and the proximate flange, and means for vibratingly moving said mold halves toward and away from each other through a known distance comprising a rotating shaft supported on one of said mold halves, an eccentric rotating upon said shaft and a yoke surrounding said mold halves and connected between said eccentric and the other of said mold halves.

5. In apparatus of the class described for molding articles from concrete mixes, a mold composed of mold halves which are spaced laterally of each other, each of said mold halves including a longitudinally extending flange along the edges of each mold half and in confronting relationship with a flange of the contiguous mold half, elastomeric means disposed between said mold halves and adapted to form a seal for the material being molded, means for connecting said mold halves together with said elastomeric means disposed between said flanges and enabling said mold halves to move toward and away from each other while so connected, said means comprising resilient means between one end of said fastening means and the proximate flange, and means for vibratingly moving said mold halves toward and away from each other through a known distance comprising a rotating shaft having its center fixed with respect to one of said mold halves, an eccentric turning with said shaft, and means pivotally connected at one end to the other of said mold halves and at its other end to said eccentric.

6. In apparatus of the class described for molding articles from concrete mixes, a mold composed of mold halves which are spaced laterally of each other, each of said mold halves including a longitudinally extending flange along the edges of each mold half and in confronting relationship with a flange of the contiguous mold half, elastomeric means disposed between said mold halves and adapted to form a seal for the material being molded, means for connecting said mold halves together with said elastomeric means disposed between said flanges and enabling said mold halves to move toward and away from each other while so connected, said means comprising resilient means between one end of said fastening means and the proximate flange, and means for vibratingly moving said mold halves toward and away from each other through a known distance comprising a rotating shaft having its center fixed with respect to said one mold half, an eccentric turning with said shaft, and means connecting said eccentric to said other mold half.

References Cited in the file of this patent

UNITED STATES PATENTS

| | | |
|---|---|---|
| 2,213,159 | Durley | Aug. 27, 1940 |
| 2,298,074 | Straub | Oct. 6, 1942 |
| 2,529,066 | Annas | Nov. 7, 1950 |

FOREIGN PATENTS

| | | |
|---|---|---|
| 50,469 | Denmark | July 15, 1935 |
| 889,923 | France | Oct. 18, 1943 |
| 431,484 | Great Britain | July 9, 1935 |
| 429,521 | Italy | Jan. 27, 1948 |